US008804028B2

(12) United States Patent
Stavely et al.

(10) Patent No.: US 8,804,028 B2
(45) Date of Patent: Aug. 12, 2014

(54) DIGITAL IMAGE PRODUCTION METHOD AND APPARATUS

(75) Inventors: Donald J. Stavely, Windsor, CO (US); Kenneth Jay Hall, Windsor, CO (US); Amy E. Battles, Windsor, CO (US); Sarah Jean Barrios, Fort Collins, CO (US); Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1927 days.

(21) Appl. No.: 10/769,338

(22) Filed: Jan. 30, 2004

(65) Prior Publication Data

US 2005/0168623 A1 Aug. 4, 2005

(51) Int. Cl.
*H04N 5/235* (2006.01)
*H04N 5/238* (2006.01)
*G03B 7/00* (2014.01)
*H04N 5/77* (2006.01)
*H04N 5/907* (2006.01)
*H04N 9/804* (2006.01)
*H04N 5/765* (2006.01)

(52) U.S. Cl.
CPC .............. *H04N 5/2355* (2013.01); *H04N 5/907* (2013.01); *H04N 5/235* (2013.01); *H04N 5/772* (2013.01); *H04N 9/8047* (2013.01); *H04N 5/765* (2013.01)
USPC .......................................... 348/362; 348/364

(58) Field of Classification Search
CPC ........................... H04N 5/2354; H04N 5/2356
USPC .................... 348/362, 367, 218.1, 219.1, 364
See application file for complete search history.

(56) References Cited

U.S. PATENT DOCUMENTS

| 5,801,773 | A  | * | 9/1998  | Ikeda ........................ 348/229.1 |
| 5,828,793 | A  | * | 10/1998 | Mann ............................. 382/284 |
| 6,418,245 | B1 | * | 7/2002  | Udagawa ....................... 382/312 |
| 7,098,946 | B1 | * | 8/2006  | Koseki et al. .............. 348/229.1 |
| 2001/0030694 | A1 | * | 10/2001 | Abe ............................... 348/223 |
| 2002/0176010 | A1 | * | 11/2002 | Wallach et al. ............ 348/229.1 |
| 2003/0117507 | A1 | * | 6/2003  | Kehtarnavaz et al. ........ 348/242 |
| 2003/0133019 | A1 | * | 7/2003  | Higurashi et al. ......... 348/218.1 |
| 2003/0151679 | A1 |   | 8/2003  | Amerson |
| 2004/0070778 | A1 | * | 4/2004  | Matama ......................... 358/1.9 |
| 2004/0174434 | A1 | * | 9/2004  | Walker et al. .............. 348/211.3 |

FOREIGN PATENT DOCUMENTS

| JP | 2001285779 A | 10/2001 |
| JP | 2003101851 A | 4/2003 |
| JP | 2003348429 A | 12/2003 |

OTHER PUBLICATIONS

U.K. Search Report dated Apr. 28, 2005.

* cited by examiner

*Primary Examiner* — Timothy J Henn
*Assistant Examiner* — Tuan Le

(57) ABSTRACT

Multiple uncompressed digital images, each at a different exposure, may be captured automatically in response to an image capture request. The set of uncompressed digital images may be stored as a single data object and manipulated to produce a final digital image.

42 Claims, 6 Drawing Sheets

DIGITAL IMAGE PRODUCTION METHOD AND APPARATUS

FIELD OF THE INVENTION

The present invention relates generally to digital photography and more specifically to methods and apparatuses for producing digital images.

BACKGROUND OF THE INVENTION

One advantage of traditional film photography over digital photography is the flexibility of its associated photofinishing process. In photofinishing, exposed film is developed, a piece of light-sensitive photographic paper is exposed through the resulting negative, and the exposed photographic paper is processed through a series of chemical solutions to produce the finished print. There is considerable flexibility in how the photofinisher or photographer develops the film (e.g., push processing), and the exposure of the photographic paper can be varied to take advantage of the wide dynamic range inherent in film.

In contrast, digital cameras typically perform the equivalent of this photofinishing step inside the camera itself. In a digital camera, an imaging sensor such as a charge-coupled device (CCD) initially produces an uncompressed digital image that is normally compressed by a significant factor in conformance with a standard such as that of the Joint Photographic Experts Group (JPEG). Prior to compression, most digital cameras also perform one or more adjustments on the uncompressed image. For example, the digital camera may correct the exposure or adjust the color balance or tone reproduction of the uncompressed image. Compression also often involves converting the uncompressed digital image from one color space to another (e.g., from RGB to $YC_rC_b$). In compression, a tremendous amount of information is lost. For example, the output of the CCD in a 5-Mpixel digital camera is typically interpolated to 15 Msamples to compensate for the CCD's mosaic pattern (i.e., to supply missing color information). Each sample may be, for example, 10, 12, or 14 bits long. This large uncompressed image, following the aforementioned adjustments, is subsequently compressed to approximately one-half to one Mbyte. When a user attempts to post-process the compressed digital image further (e.g., adjust tone reproduction, color balance, etc.), compression artifacts may become visible. Also, although the dynamic range of the original uncompressed image is fairly large, it is still not as wide as that of film. Thus, even though some digital cameras support saving a digital image in uncompressed form, the post-processing a user can perform on the uncompressed image is still somewhat limited.

It is thus apparent that there is a need in the art for an improved method and apparatus for producing digital images.

SUMMARY OF THE INVENTION

A method for producing a digital image is provided. A digital imaging device for carrying out the method is also provided. An associated image editing system that operates on digital images produced by the method and a computer-readable storage medium containing images produced by the method are also provided.

Other aspects and advantages of the present invention will become apparent from the following detailed description, taken in conjunction with the accompanying drawings, illustrating by way of example the principles of the invention.

DETAILED DESCRIPTION OF THE INVENTION

The flexibility of digital photography may be enhanced by automatically capturing and storing a set of uncompressed digital images of a scene, each digital image having a different exposure, in response to an image capture request. The set of uncompressed digital images may be conveniently saved as a single data object. The saved set of uncompressed images may then be post-processed in the digital camera or another device such as a personal computer (PC) to produce the final digital image. One advantage of such an approach is that multiple exposures of a single scene provide a wider dynamic range from which to produce the final digital image than a single exposure. Throughout this detailed description, "digital image" and "image" are used synonymously.

In some embodiments, portions of two or more of the uncompressed images may be combined to produce the final image. For example, shadow details may be taken from an overexposed uncompressed image; highlights, from an underexposed uncompressed image; and mid-tones, from a normally exposed uncompressed image. Producing the final digital image may be performed automatically, or a user may tweak virtual "knobs" to control various characteristics of the final image. Further, in some embodiments the saved set of uncompressed digital images may be treated as a single data object (e.g., a single image file).

Figure 1:
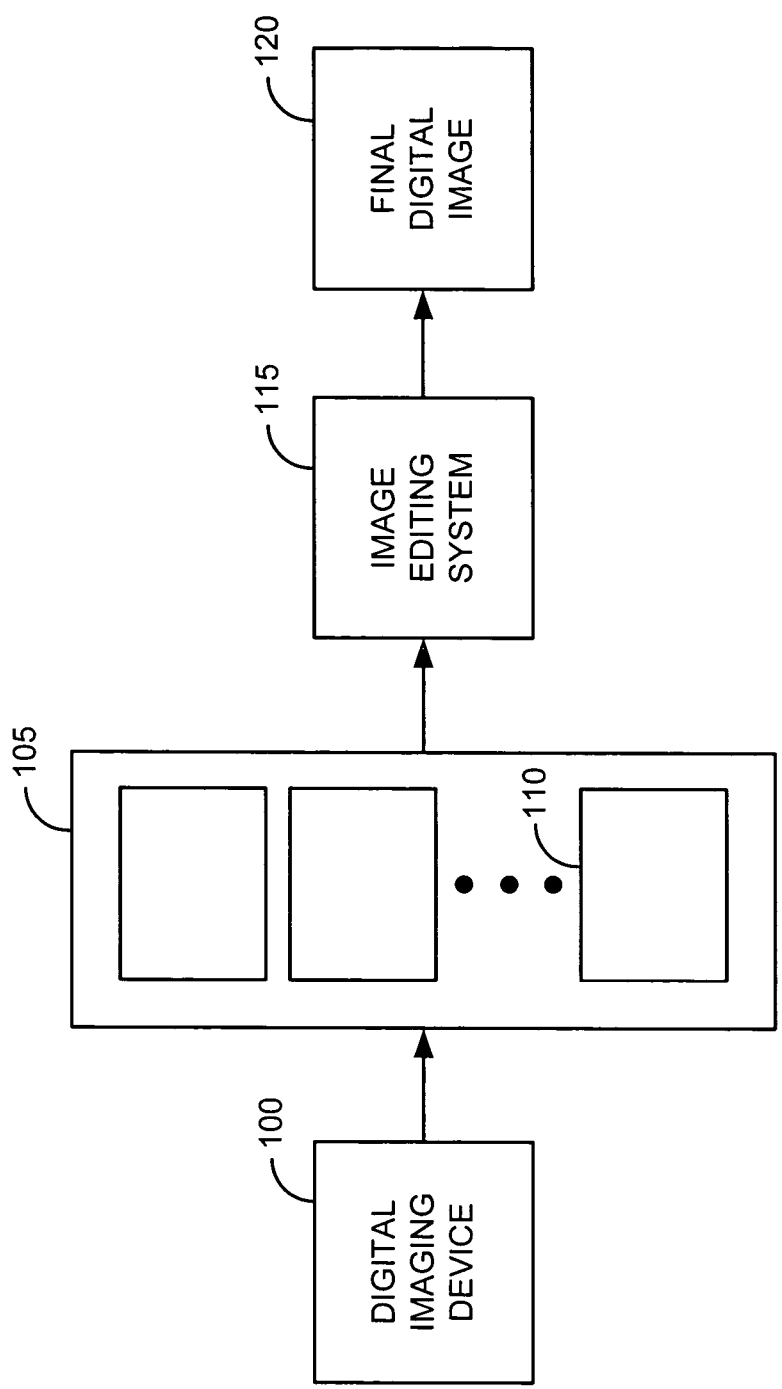
FIG. 1 is a high-level diagram of a method for producing digital images in accordance with an illustrative embodiment of the invention.

FIG. 1 is a high-level diagram of a method for producing digital images in accordance with an illustrative embodiment of the invention. In FIG. 1, digital imaging device 100, in response to an image capture request, may automatically capture a set of uncompressed digital images 105 of a scene, each uncompressed digital image 110 in set 105 being captured at a different exposure. Such an image capture mode may be a selectable operating mode in digital imaging device 100. Digital imaging device 100 may be any device capable of capturing and storing digital images, such as a digital camera, digital camcorder, personal digital assistant (PDA), or other device. The interval, if any, between exposures depends on the capabilities of the imaging sensor in digital imaging device 100. In a typical digital camera employing a CCD imaging sensor, the interval may be approximately 0.1 seconds. This delay is due to the readout time of the imaging sensor, which is simply the number of pixels times the CCD clock rate.

The set of uncompressed digital images 105 may be saved for subsequent post-processing (digital "photofinishing"). In some embodiments, the set of uncompressed digital images 105 may be stored and treated as a single data object (e.g., a single digital image file). Since individual uncompressed images are sometimes called "raw-mode images," the set of uncompressed digital images 105 may be termed a "super raw-mode image." In some embodiments, the uncompressed digital images 110 in set 105 may be interpolated to supply missing color information (i.e., demosaiced) before they are stored. Further, in some embodiments, the uncompressed digital images 110 in set 105 may be converted from one color space to another, depending on the application, before they are stored.

To reduce the space occupied by the set of uncompressed digital images 105, one uncompressed digital image 110 may be designated as a "base" image, and the remaining uncompressed digital images 110 in set 105 may be converted to difference images with respect to the base image. The difference images require, in general, far fewer bits to represent than the original uncompressed digital images 110. In other embodiments, uncompressed digital images 110 may be compressed using lossless or near-lossless compression algorithms.

Optionally, the uncompressed digital images 110 in set 105 may be combined in some way (e.g., scaled and added) to produce a single composite uncompressed digital image 110 before set 105 is stored.

Image editing system 115 may manipulate the set of uncompressed digital images 105 to produce a final digital image 120. Image editing system 115 may be any device capable of manipulating stored digital images, such as a digital camera (including the same digital camera that captures the set of uncompressed digital images 105), digital camcorder, PDA, laptop PC, notebook PC, desktop PC, workstation, or other device.

Figure 2A:
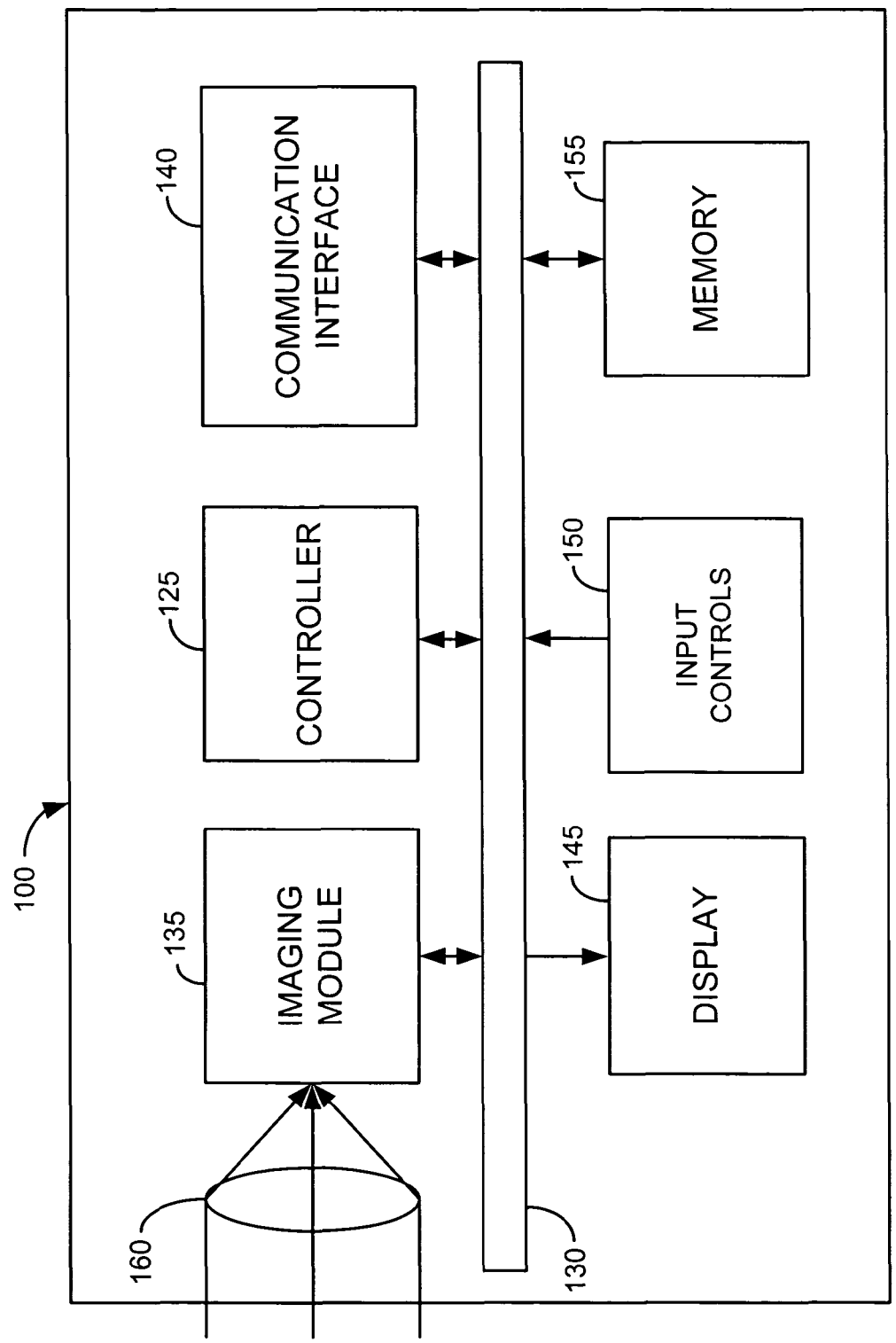
FIG. 2A is a functional block diagram of a digital imaging device in accordance with an illustrative embodiment of the invention.

FIG. 2A is a functional block diagram of a digital imaging device 100 in accordance with an illustrative embodiment of the invention. In FIG. 2A, controller 125 communicates over data bus 130 with imaging module 135, communication interface 140, display 145, input controls 150, and memory 155. Optical system 160 produces optical images that are converted to digital images by imaging module 135. Controller 125 may comprise a microprocessor or microcontroller. Imaging module 135 may comprise an array of photosensors (an "imaging sensor") based on charge-coupled-device (CCD) or CMOS technology, an analog-to-digital converter (A/D), a gain control, and a digital signal processor (DSP) (not shown in FIG. 2A). Communication interface 140 may be of the hard-wired variety, such as universal system bus (USB) or Firewire (IEEE 1394), or it may be wireless, such as Bluetooth or IEEE 802.11. Communication interface 140 may be used to transfer digital image data from digital imaging device 100 to an external device such as image editing system 115. Display 145 may comprise a liquid crystal display (LCD). Input controls 150 may include navigational buttons (e.g., directional-arrow buttons), a menu/"ok" button, a shutter release button, or other controls, physical or virtual, for controlling the operation of digital imaging device 100.

Figure 2B:
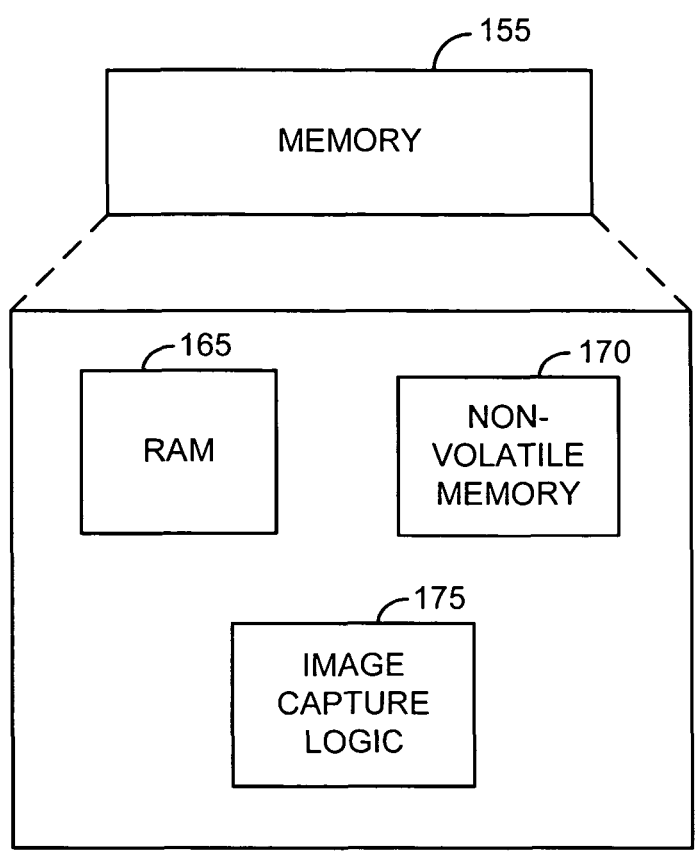
FIG. 2B is a diagram of the memory of the digital imaging device shown in FIG. 2A in accordance with an illustrative embodiment of the invention.

FIG. 2B is a diagram of memory 155 of digital imaging device 100 in accordance with an illustrative embodiment of the invention. Memory 155 may comprise random access memory (RAM) 165, non-volatile memory 170, and image capture logic 175. Non-volatile memory 170 may be of the removable variety, such as a secure digital (SD), Compact Flash (CF), or multi-media (MMC) card. Non-volatile memory 170 may be used, for example, to store set of uncompressed digital images 105. RAM 165 may include multiple image buffers for capturing a plurality of uncompressed digital images 110. Image capture logic 175 may control the activation and operation of a mode (e.g., "super raw mode") in digital imaging device 100 in which the set of uncompressed digital images 105 at different exposures is automatically captured and stored in response to an image capture request. Image capture logic 175 may also be configured to perform other operations on uncompressed digital images 110, such as interpolation (demosaicing), conversion between color spaces, combining to produce a composite uncompressed digital image 110, and lossless or near-lossless compression. In an embodiment in which base and differential images are stored as described above, image capture logic 175 may also establish the base image and compute the difference images. Further, image capture logic 175 may control the storing to non-volatile memory 170 of the set of uncompressed digital images 105, including the storing of the set of uncompressed digital images 105 as a single data object. Image capture logic 175 may be implemented in a variety of ways. In one embodiment, image capture logic comprises firmware program instructions that are executed by controller 125. In general, the functionality of image capture logic 175 may be implemented as any combination of hardware, firmware, and software.

Figure 3:
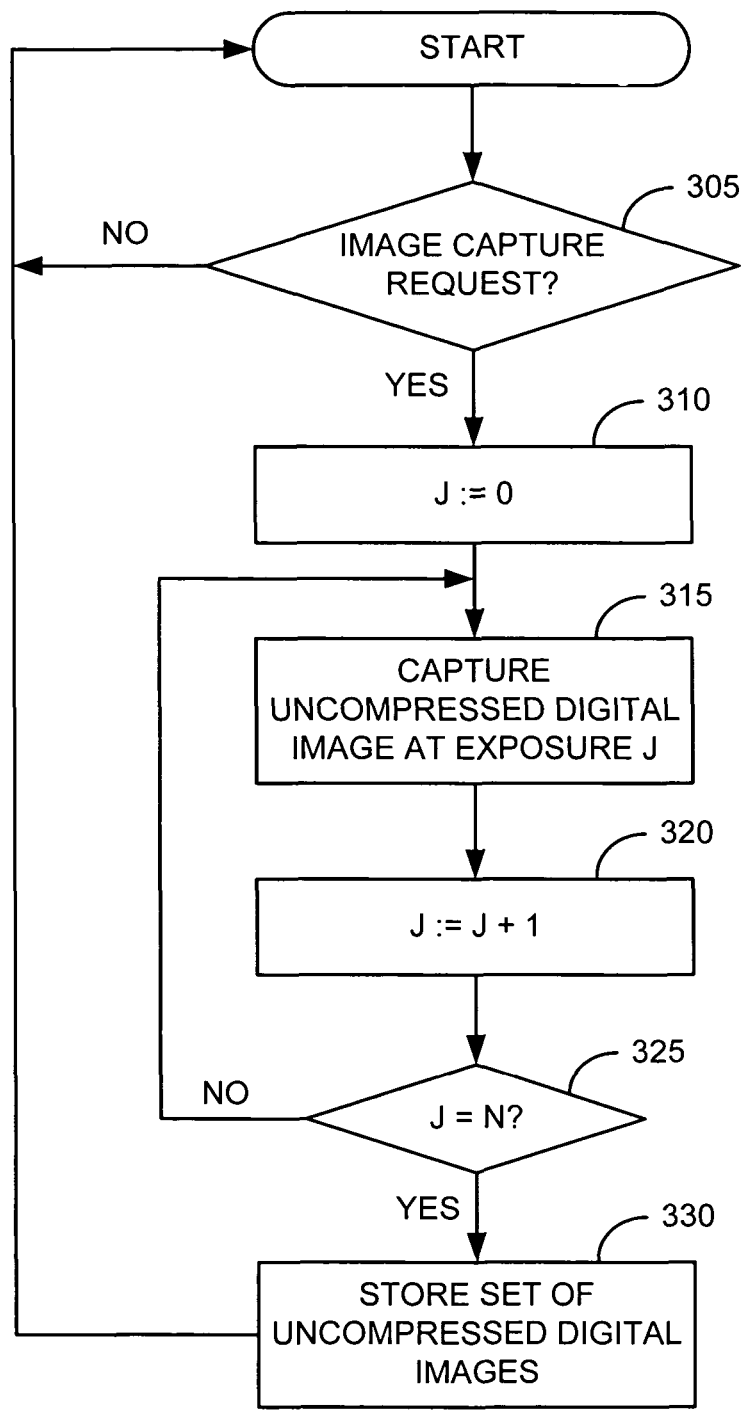
FIG. 3 is a flowchart of the operation of the digital imaging device shown in FIG. 2A in accordance with an illustrative embodiment of the invention.

FIG. 3 is a flowchart of the operation of digital imaging device 100 in accordance with an illustrative embodiment of the invention. If an image capture request (e.g., a shutter button being pressed to "S2") is received at 305, a counter J may be set to zero at 310 to initialize an image capture loop. At 315, image capture logic 175 may direct imaging module 135 to capture an uncompressed digital image 110 at an exposure level associated with counter J. At 320, counter J may be incremented. Steps 315 and 320 are repeated until, at 325, counter J equals the total number of desired exposures N, at which point the set of uncompressed digital images 105 may be stored in non-volatile memory 170 at 330, and the process may return to 305. As mentioned above, in some embodiments, image capture logic 175 may be configured to store the set of uncompressed digital images 105 as a single data object. Also, image capture logic 175 may be configured to perform other operations such as demosaicing, color space conversion, combining, and the computation of difference images at 330 before saving set 105.

The number of exposures captured may be chosen flexibly according to the application. In one illustrative embodiment, three different exposures may be captured automatically either simultaneously or in rapid succession, depending on the capabilities of imaging module 135, in response to the image capture request, one at the nominal exposure, one at two f-stops below the nominal exposure (underexposure by a factor of four), and one at two f-stops above the nominal exposure (overexposure by a factor of four). Such an approach may be termed "bracketing" the nominal exposure.

Figure 4:
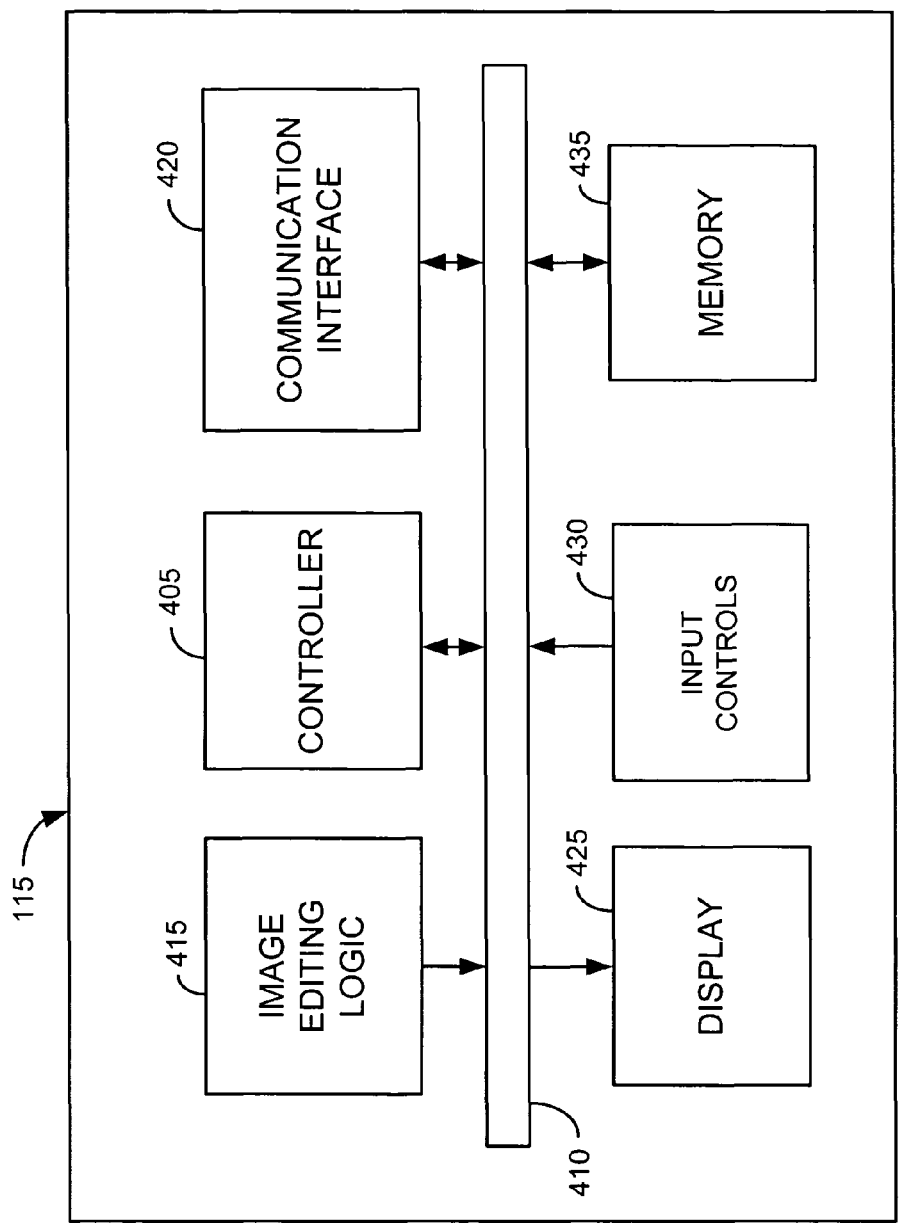
FIG. 4 is a functional block diagram of an image editing system in accordance with an illustrative embodiment of the invention.

FIG. 4 is a functional block diagram of an image editing system 115 in accordance with an illustrative embodiment of the invention. In FIG. 4, controller 405 communicates over data bus 410 with image editing logic 415, communication interface 420, display 425, input controls 430, and memory 435. Controller 405 may be, for example, a microprocessor or microcontroller. Image editing logic 415 may manipulate of one or more uncompressed digital images 110 in the set of uncompressed digital images 105 to produce final digital image 120. Image editing logic may produce final digital image 120 automatically, or it may be configured to interact with a user. Communication interface 420 may be of the hard-wired variety, such as universal system bus (USB) or Firewire (IEEE 1394), or it may be wireless, such as Bluetooth or IEEE 802.11. Communication interface 420 may be used to receive digital image data from an external device such as digital imaging device 100. Display 425 may be a CRT, flat-panel display, LCD, or other suitable display. Input controls 430 may include a set of buttons or switches, a pointing device such as mouse, a keyboard, a menu of functions, or any other input controls to facilitate image editing. Memory 435 may comprise RAM, non-volatile solid-state memory, magnetic disk storage, optical storage, any other type of storage, or any combination thereof.

Figure 5:
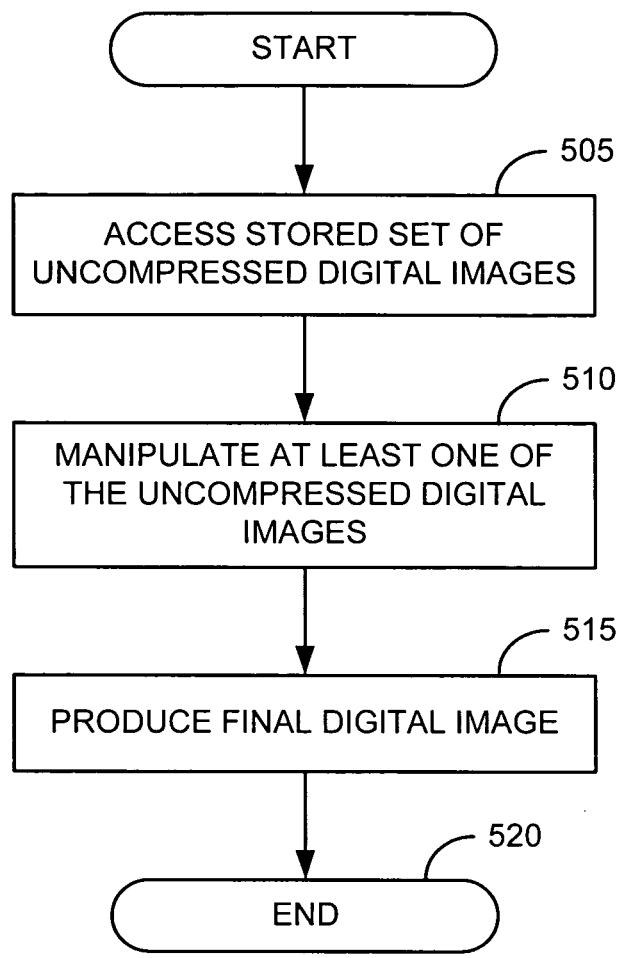
FIG. 5 is a flowchart of the operation of the image editing system shown in FIG. 4 in accordance with an illustrative embodiment of the invention.

FIG. 5 is a flowchart of the operation of image editing system 115 in accordance with an illustrative embodiment of the invention. At 505, image editing logic 415 may access a set of uncompressed digital images 105 stored in memory 435. As explained above, set 105 may be compressed using lossless or near-lossless compression prior to being accessed by image editing system 115. At 510, image editing logic 415 may manipulate one or more uncompressed digital images 110 in set 105 to produce final digital image 120 at 515. The process may then terminate at 520.

Manipulation of set 105 may include a wide variety of operations, such as adjusting brightness, contrast, levels, an individual color component, hue, saturation, or tone reproduction. Manipulation may also include, for example, scaling, rotation, or combining portions two or more uncompressed digital images 110. As mentioned above, shadow details may, for example, be taken from an overexposed uncompressed image 110; highlights, from an underexposed uncompressed image 110; and mid-tones, from a normally exposed uncompressed image 110. Further, manipulation may also include interpolation to supply missing color information (demosaicing) or color space conversion, as described above in connection with digital imaging device 100, or compression (e.g., final digital image 120 may be a JPEG file).

Figure 6:
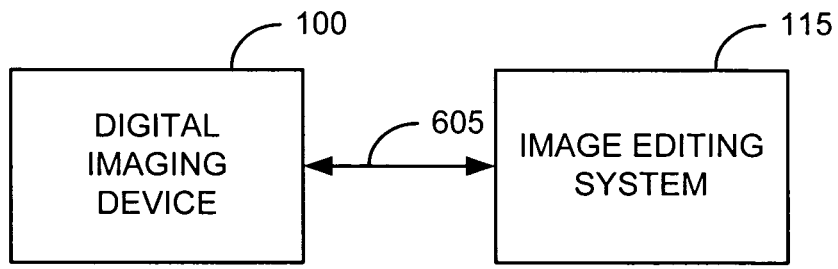
FIG. 6 is a block diagram of a digital imaging device in communication with an image editing system in accordance with an illustrative embodiment of the invention.

FIG. 6 is a block diagram of a digital imaging device 100 in communication with an image editing system 115 in accordance with an illustrative embodiment of the invention. As pointed out above, digital imaging device 100 and image editing system 115 may be one and the same device in some embodiments. In those embodiments in which they are not, it is advantageous to transfer set 105 from digital imaging device 100 to an external device such as image editing system 115 to produce final digital image 120. In FIG. 6, digital imaging device 100 may communicate with image editing system 115 over communication link 605, which may be hard-wired or wireless.

Set of uncompressed digital images 105, whether stored as a single data object or as multiple digital image files, may be embodied as a computer-readable storage medium such as a magnetic disk, optical disc, or a solid-state memory (e.g., SD or MMC card). As explained above, set 105 may be stored on the computer-readable storage medium in interpolated or uninterpolated form or as a base image with accompanying difference images, depending on the application.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for producing a digital image, comprising:
capturing automatically a plurality of uncompressed digital images of a scene in response to an image capture request provided as a selectable operating mode, each uncompressed digital image being captured at a different exposure associated with a respective value of a counter, wherein the counter is employed for iteration to a plurality of desired exposures for the scene;
interpolating each uncompressed digital image to supply missing color information;
converting each uncompressed digital image from a first color space to a second color space;
storing the plurality of uncompressed digital images as a single data object upon reaching the plurality of desired exposures for the scene as indicated by the counter; and
receiving user input via virtual knobs to control various characteristics from the plurality of desired exposures to produce a final image, the various characteristics including shadow details from an overexposed uncompressed image, highlights from an underexposed uncompressed image, and mid-tones from a normally exposed uncompressed image.

2. The method of claim 1, wherein the interpolating each uncompressed digital image to supply the missing color information occurs prior to the storing the plurality of uncompressed digital images as the single data object.

3. The method of claim 1, wherein the converting each uncompressed digital image from the first color space to the second color space occurs prior to the storing the plurality of uncompressed digital images as the single data object.

4. The method of claim 1, wherein one of the exposures is a nominal exposure and the other exposures bracket the nominal exposure as indicated by respective values of the counter.

5. The method of claim 1, wherein the single data object comprises a single composite uncompressed digital image, wherein the plurality of uncompressed digital images are combined into the single composite uncompressed digital image prior to the storing the plurality of uncompressed digital images as the single composite uncompressed digital image.

6. The method of claim 1, wherein one of the uncompressed digital images comprises a base image and the other uncompressed digital images comprise difference images with respect to the base image as indicated by respective values of the counter.

7. The method of claim 1, wherein the uncompressed digital images are compressed using one of a lossless and a near-lossless compression scheme prior to the storing the plurality of uncompressed digital images as the single data object.

8. The method of claim 1, wherein the interpolating each uncompressed digital image to supply the missing color information and the
converting each uncompressed digital image from the first color space to the second color space comprise:
accessing the stored plurality of uncompressed digital images; and
manipulating at least one of the uncompressed digital images to produce the digital image.

9. The method of claim 8, wherein the plurality of uncompressed digital images are captured and stored in a first device and the stored plurality of uncompressed digital images are transferred to and accessed by as second device.

10. The method of claim 8, wherein manipulating at least one of the uncompressed digital images comprises at least one of adjusting brightness, contrast, levels, a color component, hue, saturation, and tone reproduction.

11. The method of claim 8, wherein manipulating at least one of the uncompressed digital images comprises compressing the at least one of the uncompressed digital images.

12. The method of claim 8, wherein manipulating at least one of the uncompressed digital images comprises combining portions of at least two of the uncompressed digital images.

13. The method of claim 8, wherein the plurality of uncompressed digital images are compressed using one of a lossless and a near-lossless compression scheme prior to the storing the plurality of uncompressed digital images as the single data object.

14. The method of claim 1, wherein as indicated by respective values of the counter one of the exposures is a nominal exposure, one of the exposures is at two f-stops below the nominal exposure as underexposure by a factor of four, and one of the exposures is at two f-stops above the nominal exposure as overexposure by a factor of four.

15. The method of claim 1, wherein the capturing automatically the plurality of uncompressed digital images of the scene in response to the image capture request comprises capturing automatically and in rapid succession the plurality of uncompressed digital images of the scene in response to the image capture request.

16. A device, comprising:
  an imaging module to convert optical images to uncompressed digital images;
  image capture logic configured to capture automatically, in response to an image capture request, a plurality of uncompressed digital images of a scene produced by the imaging module, the image capture logic being configured to capture each uncompressed digital image in the plurality at a different exposure associated with a respective value of a counter, wherein the counter is employed for iteration to a plurality of desired exposures for the scene;
  image editing logic configured to interpolate each uncompressed digital image to supply missing color information, wherein the image editing logic is configured to convert each uncompressed digital image from a first color space to a second color space;
  a memory in which to store the plurality of uncompressed digital images, the image capture logic being configured to store the plurality of uncompressed digital images as a single data object upon reaching the plurality of desired exposures for the scene as indicated by the counter; and
  virtual knobs to enable user input to control image characteristics from the plurality of desired exposures to produce a final image, the image characteristics including shadow details from an overexposed uncompressed image, highlights from an underexposed uncompressed image, and mid-tones from a normally exposed uncompressed image.

17. The device of claim 16, further comprising:
  a communication interface to transfer the stored plurality of uncompressed digital images to an external device.

18. The device of claim 16, wherein the image capture logic is further configured to interpolate each uncompressed digital image to supply the missing color information prior to the image capture logic storing the plurality of uncompressed digital images as the single data object.

19. The device of claim 16, wherein the image capture logic is further configured to convert each uncompressed digital image in the plurality from the first color space to the second color space prior to the image capture logic storing the plurality of uncompressed digital images as the single data object.

20. The device of claim 16, wherein one of the exposures is a nominal exposure and the other exposures bracket the nominal exposure as indicated by respective values of the counter.

21. The device of claim 16, wherein the single data object comprises a single composite uncompressed digital image, wherein the image capture logic is further configured to combine the plurality of uncompressed digital images into the single composite uncompressed digital image.

22. The device of claim 16, wherein the image capture logic is further configured to establish one of the uncompressed digital images in the plurality as a base image and to represent the other uncompressed digital images in the plurality as difference images with respect to the base image as indicated by respective values of the counter.

23. The device of claim 16, wherein the image capture logic is further configured to compress the plurality of uncompressed digital images using one of a lossless and a near-lossless compression scheme.

24. The device of claim 16, wherein the device is one of a digital camera, a PDA, and a digital camcorder.

25. The device of claim 16, wherein as indicated by respective values of the counter one of the exposures is a nominal exposure, one of the exposures is at two f-stops below the nominal exposure as underexposure by a factor of four, and one of the exposures is at two f-stops above the nominal exposure as overexposure by a factor of four.

26. The device of claim 16, wherein the image capture logic is configured to capture the plurality of uncompressed digital images of the scene automatically and in rapid succession in response to the image capture request.

27. A system, comprising:
  a memory in which to store a single data object comprising a plurality of uncompressed digital images of a scene, each uncompressed digital image having been captured at a different exposure automatically and simultaneously by a digital imaging device in response to an image capture request; and
  image editing logic configured to manipulate at least one of the uncompressed digital images in the plurality to produce a final digital image based on user input received via virtual knobs controlling various characteristics using the plurality of uncompressed digital images of the scene, the various characteristics including shadow details from an overexposed uncompressed image, highlights from an underexposed uncompressed image, and mid-tones from a normally exposed uncompressed image;
  wherein the image editing logic is configured to interpolate the at least one of the uncompressed digital images to supply missing color information;
  wherein the image editing logic is configured to convert the at least one of the uncompressed digital images from a first color space to a second color space.

28. The system of claim 27, further comprising:
  a communication interface to receive the single data object from an external device.

29. The system of claim 27, wherein the image editing logic is configured to interact with a user.

30. The system of claim 27, wherein the image editing logic is configured to manipulate the at least one of the uncompressed digital images by performing at least one of adjusting brightness, contrast, levels, a color component, hue, saturation, and tone reproduction.

31. The system of claim 27, wherein the image editing logic is configured to compress the at least one of the uncompressed digital images in producing the final digital image.

32. The system of claim 27, wherein the image editing logic is configured to combine portions of at least two of the uncompressed digital images in producing the final digital image.

33. The system of claim 27, wherein the single data object comprises a plurality of compressed digital images generated by compressing the plurality of uncompressed digital images using one of a lossless and a near-lossless compression scheme.

34. The system of claim 27, wherein the system is one of a digital camera, a personal computer, a laptop computer, a notebook computer, and a PDA.

35. A non-transitory computer-readable storage medium containing digital image data stored upon reaching a plurality of desired exposures for a scene as indicated by a counter, the digital image data comprising a single data object, the single data object comprising a plurality of uncompressed digital images of the scene captured automatically by a digital imaging device in response to an image capture request, each uncompressed digital image having been captured at a different exposure associated with a respective value of the counter, wherein the counter is employed for iteration to the plurality of desired exposures for the scene, wherein each uncompressed digital image is interpolated to supply missing color information and converted from a first color space to a second color space, and wherein input is received via virtual knobs to enable a user to control various characteristics from the plurality of desired exposures to produce a final image, the various characteristics including shadow details from an overexposed uncompressed image, highlights from an underexposed uncompressed image, and mid-tones from a normally exposed uncompressed image.

36. The computer-readable storage medium of claim 35, wherein the single data object comprises a single digital image file.

37. The computer-readable storage medium of claim 35, wherein one of the uncompressed digital images in the plurality comprises a base image and the other uncompressed digital images in the plurality comprise difference images with respect to the base image as indicated by respective values of the counter.

38. The computer-readable storage medium of claim 35, wherein the single data object comprises a plurality of compressed digital images generated by compressing the plurality of uncompressed digital images using one of a lossless and a near-lossless compression scheme.

39. The computer-readable storage medium of claim 35, wherein the uncompressed digital images in the plurality have been interpolated to supply missing color information prior to being stored as the single data object.

40. The computer-readable storage medium of claim 35, wherein the computer-readable storage medium comprises one of a magnetic disk, an optical disc, and a solid-state memory.

41. A device, comprising:
means for converting optical images to uncompressed digital images;
means for capturing automatically, in response to an image capture request, a plurality of uncompressed digital images of a scene produced by the means for converting optical images to uncompressed digital images, each uncompressed digital image in the plurality being captured at a different exposure associated with a respective value of a counter, wherein the counter is employed for iteration to a plurality of desired exposures for the scene;
means for interpolating each uncompressed digital image to supply missing color information;
means for converting each uncompressed digital image from a first color space to a second color space;
means for storing the plurality of uncompressed digital images as a single data object upon reaching the plurality of desired exposures for the scene as indicated by the counter; and
means for receiving user input via virtual knobs to control various characteristics from the plurality of desired exposures to produce a final image, the various characteristics including shadow details from an overexposed uncompressed image, highlights from an underexposed uncompressed image, and mid-tones from a normally exposed uncompressed image.

42. A system, comprising:
means for storing a single data object comprising a plurality of uncompressed digital images of a scene, each uncompressed digital image having been captured at a different exposure automatically and simultaneously by a digital imaging device in response to an image capture request; and
means for manipulating, based on input received via virtual knobs, various characteristics of the uncompressed digital images in the plurality to produce a final digital image, the various characteristics including shadow details from an overexposed uncompressed image, highlights from an underexposed uncompressed image, and mid-tones from a normally exposed uncompressed image;
wherein the means for manipulating is configured to interpolate the at least one of the uncompressed digital images to supply missing color information;
wherein the means for manipulating is configured to convert the at least one of the uncompressed digital images from a first color space to a second color space.

* * * * *

UNITED STATES PATENT AND TRADEMARK OFFICE
CERTIFICATE OF CORRECTION

PATENT NO. : 8,804,028 B2
APPLICATION NO. : 10/769338
DATED : August 12, 2014
INVENTOR(S) : Donald J. Stavely et al.

Page 1 of 1

It is certified that error appears in the above-identified patent and that said Letters Patent is hereby corrected as shown below:

In the Claims,

In column 7, line 2, in Claim 9, delete "as" and insert -- a --, therefor.

In column 8, line 2, in Claim 19, delete "uncompressed." and insert -- uncompressed --, therefor.

Signed and Sealed this
Seventeenth Day of February, 2015

Michelle K. Lee
*Deputy Director of the United States Patent and Trademark Office*